Oct. 30, 1928. 1,689,502
C. A. SABBAH
RECTIFYING SYSTEM
Filed Feb. 9, 1927
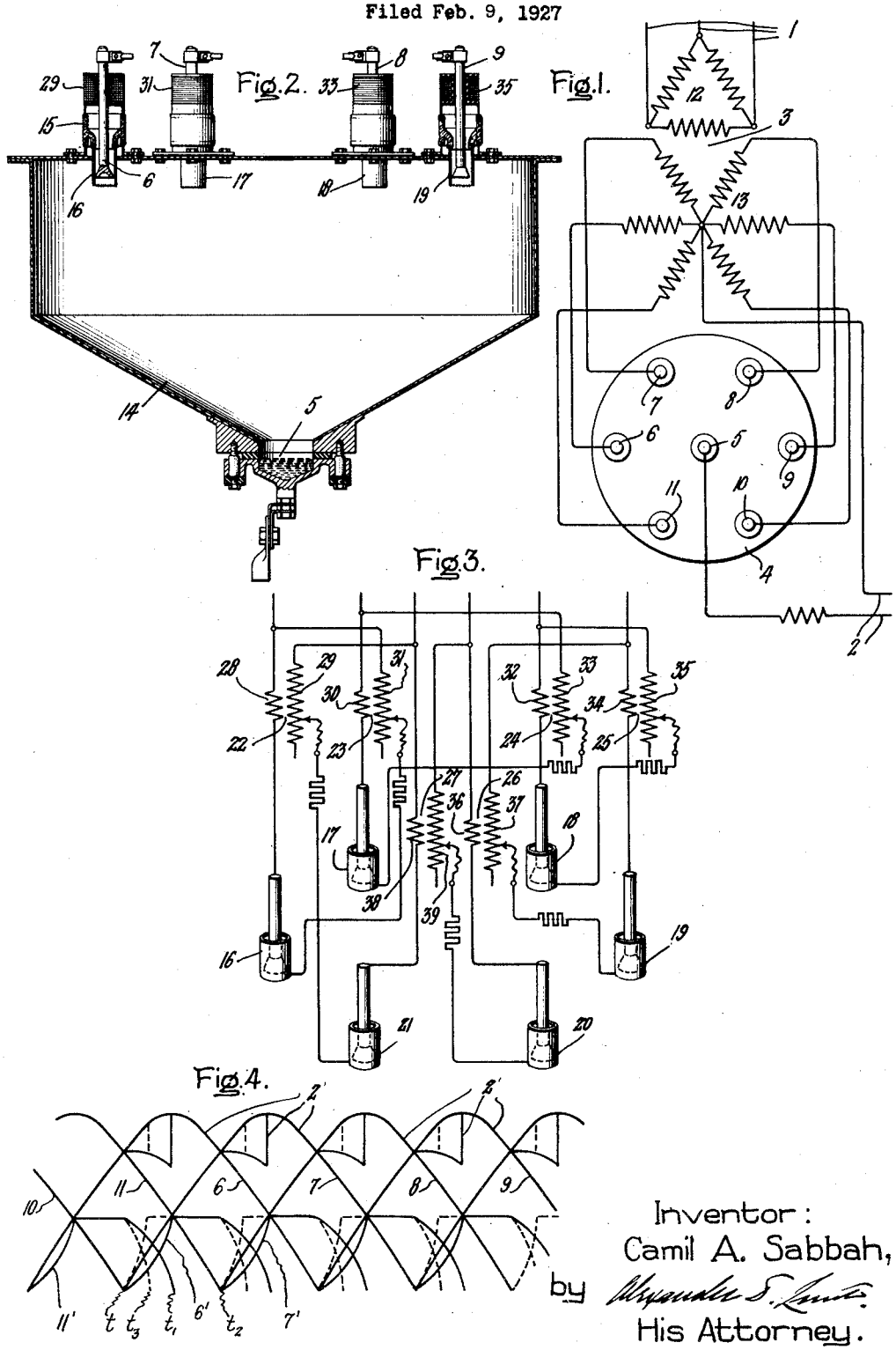
Inventor:
Camil A. Sabbah,
by
His Attorney.

Patented Oct. 30, 1928.

1,689,502

UNITED STATES PATENT OFFICE.

CAMIL A. SABBAH, OF SCHENECTADY, NEW YORK, ASSIGNOR TO GENERAL ELECTRIC COMPANY, A CORPORATION OF NEW YORK.

RECTIFYING SYSTEM.

Application filed February 9, 1927. Serial No. 167,021.

My invention relates to systems wherein power is transmitted between direct and alternating current circuits through a space discharge device, such as a rectifier provided with a mercury cathode and a plurality of anodes, and has for its principal object the provision of an improved apparatus and method of operation whereby the relation between the electrical conditions of such circuits may be effectively regulated.

When power is supplied to a direct current circuit through a transformer and a mercury rectifier, difficulty is encountered due to the fact that the voltage of the direct current circuit is not constant but tends to vary inversely as the direct current load. This variation in the direct current voltage is largely the result of the changes which are produced in the transformer resistance and reactance drop by change in the rectifier load. It has been proposed to neutralize the effect of these voltage drops by varying the magnetic saturation of a balancing coil or interphase transformer connected between the two neutrals of two Y-connected secondary windings of the main power transformer which transmits current to the rectifier. By this method of regulation, the amount by which the successive half cycles of rectified current overlap is regulated either to maintain the voltage of the direct current circuit substantially constant or to cause this voltage to increase with increase in load. In accordance with my invention, a change in the electrical conditions of one of the restifier anodes is utilized to interrupt the current of another anode and to regulate the overlap of successive half cycles of rectified current.

My invention will be better understood from the following description when considered in connection with the accompanying drawings and its scope will be pointed out in the appended claims.

Referring to the drawings, Fig. 1 is a wiring diagram of a well known type of rectifying system; Figs. 2 and 3 illustrate certain features of a rectifier constructed in accordance with my invention; and Fig. 4 shows a plurality of curves relating to the operation of this rectifier.

Fig. 1 illustrates a system wherein current is transmitted between an alternating current circuit 1 and a direct current circuit 2 through a transformer 3 and a rectifier 4 which comprises a cathode 5 and anodes 6 to 11. It will be observed that the transformer 3 comprises a primary winding 12 and secondary windings 13 and that the direct current load circuit is connected between the cathode 5 and the neutral terminal of the winding 13.

As indicated in Fig. 2, the cathode 5 and anodes 6 to 11 are located within and insulated from an evacuated receptacle 14 and each of the anodes is provided with a grid or control electrode which is supported by an insulation sleeve interposed between the tank 14 and the anode lead. Thus the lead of anode 6 is insulated from the tank 14 by an insulation sleeve 15 provided with an inwardly projecting flange which supports a grid or control member 16 comprising a cylindrical shield closed at its lower end by wire gauze or the like. Like grids 17, 18, 19, 20 and 21 are arranged to enclose the anodes 7, 8, 9, 10 and 11 respectively.

As shown by Fig. 3, the potentials of the grids 16 to 21 are controlled by transformers 22 to 27 each of which comprises a primary circuit connected in series with one of the anode leads and a secondary winding connected between the grid and lead of another of the anodes. Thus the transformer 22 comprises a primary winding 28 connected in series with the anode 6, and a secondary winding 29 connected between the grid 21 and the lead of anode 11; the transformer 23 comprises a primary winding 30 connected in series with the anode 7, and a secondary winding 31 connected between the grid 16 and the lead of anode 6; the transformer 24 comprises a winding 32 connected in the lead of anode 8 and a winding 33 connected between the grid 17 and the lead of anode 7; the transformer 25 comprises a winding 34 connected in the lead of anode 9 and a winding 35 connected between the grid 18 and the lead of anode 8; the transformer 26 comprises a winding 36 connected in the lead of anode 10, and a winding 37 connected between the grid 19 and the lead of anode 9; and the transformer 27 comprises a winding 38 connected in the lead of anode 11, and a winding 39 connected between the grid 20 and the lead of anode 10. It will be apparent that connections of the secondary windings 29, 31, 33, 35, 37 and 39 may be completed through adjustable taps and that the primary windings 28, 30, 32, 34, 36 and 38 may each comprise a few turns or may each be a single turn formed by an anode lead, as indicated in Fig. 2.

The operation of the system will be explained by reference to Fig. 4 wherein the voltages applied to the anodes 6 to 11 are indicated by the same numerals as the anodes, the currents of these anodes are indicated by the same numerals primed, and the voltage of the direct current circuit 2' is indicated by the saw-tooth curve 2 which almost coincides with the curves 6 to 11 during certain intervals of time. It will be apparent that the anode having the highest voltage at any given instant of time will tend to carry all the current to the rectifier. Thus, at the instant $t$, the voltages of anodes 11 and 6 are equal and current begins in anode 6 as indicated by the curve 6' and starts to decrease in the anode 11 as indicated by the curve 11'. Assuming the primary currents of the transformers 22 to 27 to be small, current will be interrupted in the anode 11 at the instant $t_1$ as indicated by the curve 11', and the current of the rectifier will be carried by the anode 6 during the interval $t_1$—$t_2$ as indicated by the curve 6'. At the end of the interval $t_1$—$t_2$, current starts in the anode 7 and begins to decrease in the anode 6 as indicated by the curves 6' and 7'. Current is thus carried by the anodes 11 and 6 during the interval $t$—$t_1$ which is known as the period of overlap.

The length of this period of overlap determines the relation between the voltages of the alternating current circuit 1 and the direct current circuit 2. Thus with the period of overlap comparatively long as indicated by the full line curves 11' and 6', the average voltage of the circuit 2 is comparatively low due to the large depressions in the saw-tooth curve 2' which almost coincides with the curves 6 to 11 during the intervals when the current is carried by a single anode but dips below these curves during the period of overlap.

By making the reactance in the separate phases such that the angle of overlap is large at small loads and gradually decreases with load, the voltage of the direct current circuit may be maintained substantially constant. Under these conditions, the resistance drop which increases with load is exactly balanced by the rise in voltage produced by the reduction in the angle of overlap.

The effect of the transformers 22 to 27 and the grids is to shorten the period of overlap and prevent decrease in the direct current voltage as the load of the circuit 2 increases. It is known that with the grids close to the anodes the anode currents can always be interrupted by applying high enough voltage to the grid. The instant at which current is interrupted in the anode 11, for example, will depend on the magnitude of the current transmitted through this anode. At the instant $t$ when the current starts in the anode 6, a negative voltage is applied to the grid 21 through the secondary winding 29 and the current 11' is interrupted at an instant $t_3$ as indicated by the dotted line instead of the instant $t_1$, thus shortening the period of overlap and causing the saw-tooth curve of direct current voltage almost to coincide with the curves 6 to 11 throughout a greater part of each half cycle of rectified voltage. Under these conditions the entire current is transmitted through the anode 6 during the interval $t_3$—$t_2$ instead of the interval $t_1$—$t_2$.

Likewise at the instant $t_2$ when current starts in the anode 7, a high negative voltage is applied to the grid 16 through the winding 31 and the period during which current is carried by both the anode 7 and the anode 6 is materially decreased. The further operation of the apparatus is a repetition of the steps previously set forth and will be readily understood without further explanation. It will be apparent that the exact interval of overlap for any given load current may be adjusted by moving the adjustable secondary terminals of the transformers 22 to 27.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is,—

1. The combination of a mercury arc rectifier provided with a cathode and a plurality of anodes and with a grid arranged to control the current of one of said anodes, and means comprising a current transformer arranged to apply to said grid a potential which is dependent on the current of another of said anodes.

2. The combination of a space discharge device comprising a cathode and a plurality of anodes, a grid arranged to control the current of one of said anodes, and a transformer provided with a winding connected between said grid and said anode and with a winding connected in series with another of said anodes.

3. The combination of a polyphase alternating current source, a space discharge device provided with a plurality of anodes each connected to a different terminal of said source and with a plurality of grids each arranged to control the current of a different one of said anodes, and a plurality of transformers each provided with a winding connected in series with one of said anodes and with a winding connected between another of said anodes and its control grid.

4. The combination of a polyphase alternating current source, a space discharge device provided with a plurality of anodes each connected to a different terminal of said source and with a plurality of grids each arranged to control the current of a different one of said anodes, a plurality of transformers each provided with a winding connected in series with one of said anodes and with a winding connected between another of said anodes and its control grid, and means for adjusting a terminal of each of said transformers.

5. The combination of a space discharge device provided with a cathode and a plurality of anodes and with a plurality of grids each arranged to control the current of a different one of said anodes, a polyphase source comprising terminals each connected to a different one of said anodes, a direct current source connected between said cathode and the neutral terminal of said source, and means for applying between each of said anodes and its grid a potential which is dependent on an electrical condition of another of said anodes.

6. The method of regulating the direct current voltage of a mercury arc rectifier wherein current is transmitted between a cathode and a plurality of anodes and wherein a plurality of grids are each arranged to control the current of a different one of said anodes, which comprises applying between each of said anodes and its control grid a potential which is dependent on an electrical condition of another of said anodes.

7. The method of regulating the direct current voltage of a mercury arc rectifier wherein current is transmitted between a cathode and a plurality of anodes and wherein a plurality of grids are each arranged to control the current of a different one of said anodes, which comprises applying between each of said anodes and its control grid a potential which is dependent on the starting of current in another of said anodes.

In witness whereof, I have hereunto set my hand this 8th day of February, 1927.

CAMIL A. SABBAH.